United States Patent
Hooli et al.

(10) Patent No.: US 12,227,160 B2
(45) Date of Patent: Feb. 18, 2025

(54) APPARATUS, METHOD, AND COMPUTER PROGRAM FOR SCHEDULING TRANSMISSIONS

(71) Applicant: Nokia Technologies Oy, Espoo (FI)

(72) Inventors: Kari Hooli, Oulu (FI); Esa Tiirola, Kempele (FI); Karol Schober, Helsinki (FI); Timo Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 681 days.

(21) Appl. No.: 17/498,690

(22) Filed: Oct. 11, 2021

(65) Prior Publication Data

US 2022/0030627 A1 Jan. 27, 2022

Related U.S. Application Data

(60) Provisional application No. 63/091,667, filed on Oct. 14, 2020.

(51) Int. Cl.
*B60T 8/32* (2006.01)
*B60T 8/172* (2006.01)
(Continued)

(52) U.S. Cl.
CPC ............ *B60T 8/3215* (2013.01); *B60T 8/172* (2013.01); *B60T 8/1755* (2013.01); *B60T 8/58* (2013.01);
(Continued)

(58) Field of Classification Search
CPC ...... B60T 8/3215; B60T 8/172; B60T 8/1755; B60T 8/58; B60T 2260/04; B62D 11/003;
(Continued)

(56) References Cited

U.S. PATENT DOCUMENTS 10,764,946 B2 9/2020 Sihlbom et al.
2016/0381596 A1 12/2016 Hu et al.
(Continued)

FOREIGN PATENT DOCUMENTS

| WO | 2005/041467 A2 | 5/2005 |
| WO | 2021/038121 A1 | 3/2021 |
| WO | 2021/151719 A1 | 8/2021 |

OTHER PUBLICATIONS

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.
(Continued)

*Primary Examiner* — Ricky Q Ngo
*Assistant Examiner* — Kabir U Jahangir
(74) *Attorney, Agent, or Firm* — Barta Jones, PLLC

(57) ABSTRACT

A method may include, by an apparatus, sensing at least one beam; initiating a channel occupancy time based on the sensing; transmitting at least one first downlink transmission on the at least one beam during the channel occupancy time, wherein the at least one first downlink transmission on the at least one beam triggers at least one first uplink transmission on the at least one beam during the channel occupancy time; receiving the at least one first uplink transmission on the at least one beam during the channel occupancy time; determining interference condition on the at least one beam based on the at least one first uplink transmission; and scheduling at least one second downlink transmission or at least one second uplink transmission on the at least one beam with restriction during a rest of the channel occupancy time when the interference condition meets at least one threshold requirement.

18 Claims, 13 Drawing Sheets

(51) Int. Cl.
  *B60T 8/1755* (2006.01)
  *B60T 8/58* (2006.01)
  *B62D 11/00* (2006.01)
  *B62D 11/08* (2006.01)
  *B62D 11/10* (2006.01)
  *H04W 72/541* (2023.01)
  *H04W 74/0808* (2024.01)

(52) U.S. Cl.
  CPC ............ *B62D 11/003* (2013.01); *B62D 11/08* (2013.01); *B62D 11/10* (2013.01); *H04W 72/541* (2023.01); *H04W 74/0808* (2013.01); *B60T 2260/04* (2013.01)

(58) Field of Classification Search
  CPC ..... B62D 11/08; B62D 11/10; H04W 72/541; H04W 74/0808; H04W 72/046; H04W 72/54
  See application file for complete search history.

(56) References Cited

U.S. PATENT DOCUMENTS

| | | | |
|---|---|---|---|
| 2019/0364449 A1* | 11/2019 | Yang | H04W 72/04 |
| 2020/0008087 A1* | 1/2020 | Papaleo | H04W 72/542 |
| 2020/0120518 A1* | 4/2020 | Geng | H04J 11/0056 |
| 2022/0272753 A1* | 8/2022 | Hakola | H04B 7/086 |
| 2022/0303108 A1* | 9/2022 | Faxér | H04L 5/1461 |

OTHER PUBLICATIONS

"Multiple-Gigabit/s radio equipment operating in the 60 GHz band; Harmonised Standard covering the essential requirements of article 3.2 of Directive 2014/53/EU", ETSI EN 302 567, V2.1.1, Jul. 2017, pp. 1-40.
"3rd Generation Partnership Project; Technical Specification Group Radio Access Network; Physical layer procedures for shared spectrum channel access (Release 16)", 3GPP TS 37.213, V16.3.0, Sep. 2020, pp. 1-26.

* cited by examiner

| slot | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| b1 | DCI | | | | A-CSI | normal | | | DCI | DL | DL | | | | ACK | DCI | DL | DL | | | ACK | DCI | DL | DL | |
| b1-Phase | 1 | | | | 1 | | | | 2 | 2 | 2 | | | | | 2 | 2 | 2 | | | | 2 | 2 | 2 | |
| b2 | | DCI | | | | A-CSI significant | | | | | | | | | | | | | | | | | | | |
| b2-Phase | | 1 | | | | 1 | | | | | | | | | | | | | | | | | | | |
| b3 | | | DCI | | | | A-CSI considerable | | | | | DCI | DL | DL | | | | | ACK | | | | | | |
| b3-Phase | | | 1 | | | | 1 | | | | | 2 | 2 | 2 | | | | | 2 | | | | | | |
| b4 | | | | DCI | | | | A-CSI significant | | | | | | | | | | | | | | | | | |
| b4-Phase | | | | 1 | | | | 1 | | | | | | | | | | | | | | | | | |

Fig. 11

APPARATUS, METHOD, AND COMPUTER PROGRAM FOR SCHEDULING TRANSMISSIONS

RELATED APPLICATIONS

The present application claims priority from U.S. Provisional Application No. 63/091,667, filed 14 Oct. 2020.

FIELD OF THE DISCLOSURE

The present disclosure relates to an apparatus, a method, and a computer program for scheduling uplink transmissions or downlink transmissions in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus caused to: sense at least one beam; initiate a channel occupancy time based on the sensing; transmit at least one first downlink transmission on the at least one beam during the channel occupancy time, wherein the at least one first downlink transmission on the at least one beam triggers at least one first uplink transmission on the at least one beam during the channel occupancy time; receive the at least one first uplink transmission on the at least one beam during the channel occupancy time; determine interference condition on the at least one beam based on the at least one first uplink transmission; and schedule at least one second downlink transmission or at least one second uplink transmission on the at least one beam with restriction during a rest of the channel occupancy time when the interference condition meets at least one threshold requirement, wherein the restriction restricts a number and/or a duration of the at least one second downlink transmission or a number and/or a duration of the at least one second uplink transmission.

Initiating a channel occupancy time based on the sensing may comprise: initiating a channel occupancy time when the sensing indicates that a channel on the at least one beam is idle during a listening period.

The at least one first downlink transmission may comprise downlink control information. The at least one first downlink transmission may comprise multiple first downlink transmissions. The at least one beam may comprise K beams and the at least one first downlink transmission comprises one first downlink transmission per beam. The at least one beam may comprise one beam and wherein the at least one first downlink transmission comprises K first downlink transmissions per beam. The multiple first downlink transmissions may be consecutive. The at least one first uplink transmission may comprise at least one of: uplink control information; and/or uplink data. The at least one first uplink control transmission may comprise at least one of: a hybrid automatic repeat request acknowledgement; and/or a channel state channel state information report.

The at least one second downlink transmission may comprise downlink data or the at least one second uplink transmission comprise uplink data. The number and/or duration of the at least one second downlink transmission or at least one second uplink transmission may be specific per beam. The at least one first downlink transmission may addressed to multiple terminals; the at least one second downlink transmission may be addressed to the multiple terminals; the at least one first uplink transmission may be received from the multiple terminals; and/or the at least one second uplink transmission may be received from the multiple terminals.

The number and/or duration of the at least one second downlink transmission or at least one second uplink transmission is specific per beam pair link. The at least one first downlink transmission may be addressed to a terminal; the at least one second downlink transmission may be addressed to the terminal; the at least one first uplink transmission may be received from the terminal; and/or the at least one second uplink transmission may be received from the terminal. The at least one first downlink transmission may comprise a number of first downlink transmission lower than a predetermined maximum number. The interference condition may be: low; high; or very high;

The interference condition may be low when a quality metrics indicated by the at least one first uplink transmission is greater than a first threshold; the interference condition may be high when the quality metrics indicated by the at least one first uplink transmission is between the first threshold and a second threshold; and the interference condition may be very high when the quality metrics indicated by the at least one first uplink transmission is greater than the second threshold or no first uplink transmission is received.

The interference condition may be low when a quality metrics indicated by the at least one first uplink transmission is lower than a previous quality metrics indicated by at least one previous first uplink transmission by less than a first threshold or greater than the previous quality metrics indicated by at least one previous first uplink transmission and the quality metrics indicated by the at least one first uplink transmission is greater than a second threshold; the interference condition may be high when the quality metrics indicated by the at least one first uplink transmission is lower than the previous quality metrics indicated by at least one previous first uplink transmission by more than the first threshold and by less than a third threshold and the quality metrics indicated by the at least one first uplink transmission is greater than the second threshold; and the interference condition may be very high when the quality metrics indicated by the at least one first uplink transmission is lower than the previous quality metrics indicated by at least one previous first uplink transmission by more than the third threshold or the quality metrics indicated by the at least one first uplink transmission is lower than the second threshold or no first uplink transmission is received.

The quality metrics or the previous quality metrics may comprise a channel quality indicator, a reference signal received power or a ratio of positive acknowledgements over positive and negative acknowledgments.

The apparatus may be caused to: schedule at least second downlink transmission or at least one uplink transmission on the at least one beam during the rest of channel occupancy time without restriction when the interference condition is low; schedule at least second downlink transmission or at least one uplink transmission on the at least one beam during the rest of channel occupancy time with restriction when the interference condition is high; and schedule no second downlink transmission or at least one uplink transmission on the at least one beam during the rest of channel occupancy time when the interference condition is very high.

The restriction may comprise a maximum number and/or a maximum duration of the at least one second downlink transmission or a maximum number and/or a maximum duration of the at least one second uplink transmission. The apparatus may be an access node. The at least one beam may comprise an access node reception beam and an associated access node transmission beam.

According to an aspect there is provided an apparatus comprising at least one processor and at least one memory including computer code for one or more programs, the at least one memory and the computer code configured, with the at least one processor, to cause the apparatus at least to: sense at least one beam; initiate a channel occupancy time based on the sensing; transmit at least one first downlink transmission on the at least one beam during the channel occupancy time, wherein the at least one first downlink transmission on the at least one beam triggers at least one first uplink transmission on the at least one beam during the channel occupancy time; receive the at least one first uplink transmission on the at least one beam during the channel occupancy time; determine interference condition on the at least one beam based on the at least one first uplink transmission; and schedule at least one second downlink transmission or at least one second uplink transmission on the at least one beam with restriction during a rest of the channel occupancy time when the interference condition meets at least one threshold requirement, wherein the restriction restricts a number and/or a duration of the at least one second downlink transmission or a number and/or a duration of the at least one second uplink transmission.

Initiating a channel occupancy time based on the sensing may comprise: initiating a channel occupancy time when the sensing indicates that a channel on the at least one beam is idle during a listening period. The at least one first downlink transmission may comprise downlink control information. The at least one first downlink transmission may comprise multiple first downlink transmissions. The at least one beam may comprise K beams and the at least one first downlink transmission comprises one first downlink transmission per beam. The at least one beam may comprise one beam and wherein the at least one first downlink transmission comprises K first downlink transmissions per beam.

The multiple first downlink transmissions may be consecutive. The at least one first uplink transmission may comprise at least one of: uplink control information; and/or uplink data. The at least one first uplink control transmission may comprise at least one of: a hybrid automatic repeat request acknowledgement; and/or a channel state channel state information report. The at least one second downlink transmission may comprise downlink data or the at least one second uplink transmission comprise uplink data. The number and/or duration of the at least one second downlink transmission or at least one second uplink transmission may be specific per beam.

The at least one first downlink transmission may addressed to multiple terminals; the at least one second downlink transmission may be addressed to the multiple terminals; the at least one first uplink transmission may be received from the multiple terminals; and/or the at least one second uplink transmission may be received from the multiple terminals.

The number and/or duration of the at least one second downlink transmission or at least one second uplink transmission is specific per beam pair link. The at least one first downlink transmission may be addressed to a terminal; the at least one second downlink transmission may be addressed to the terminal; the at least one first uplink transmission may be received from the terminal; and/or the at least one second uplink transmission may be received from the terminal. The at least one first downlink transmission may comprise a number of first downlink transmission lower than a predetermined maximum number. The interference condition may be: low; high; or very high;

The interference condition may be low when a quality metrics indicated by the at least one first uplink transmission is greater than a first threshold; the interference condition may be high when the quality metrics indicated by the at least one first uplink transmission is between the first threshold and a second threshold; and the interference condition may be very high when the quality metrics indicated by the at least one first uplink transmission is greater than the second threshold or no first uplink transmission is received.

The interference condition may be low when a quality metrics indicated by the at least one first uplink transmission is lower than a previous quality metrics indicated by at least one previous first uplink transmission by less than a first threshold or greater than the previous quality metrics indicated by at least one previous first uplink transmission and the quality metrics indicated by the at least one first uplink transmission is greater than a second threshold; the interference condition may be high when the quality metrics indicated by the at least one first uplink transmission is lower than the previous quality metrics indicated by at least one previous first uplink transmission by more than the first threshold and by less than a third threshold and the quality metrics indicated by the at least one first uplink transmission is greater than the second threshold; and the interference condition may be very high when the quality metrics indicated by the at least one first uplink transmission is lower than the previous quality metrics indicated by at least one previous first uplink transmission by more than the third threshold or the quality metrics indicated by the at least one first uplink transmission is lower than the second threshold or no first uplink transmission is received.

The quality metrics or the previous quality metrics may comprise a channel quality indicator, a reference signal received power or a ratio of positive acknowledgements over positive and negative acknowledgments.

The at least one memory and the computer code may be configured, with the at least one processor, to cause the apparatus at least to: schedule at least second downlink transmission or at least one uplink transmission on the at least one beam during the rest of channel occupancy time without restriction when the interference condition is low; schedule at least second downlink transmission or at least one uplink transmission on the at least one beam during the rest of channel occupancy time with restriction when the interference condition is high; and schedule no second downlink transmission or at least one uplink transmission on the at least one beam during the rest of channel occupancy time when the interference condition is very high.

The restriction may comprise a maximum number and/or a maximum duration of the at least one second downlink transmission or a maximum number and/or a maximum duration of the at least one second uplink transmission. The apparatus may be an access node. The at least one beam may comprise an access node reception beam and an associated access node transmission beam.

According to an aspect there is provided an apparatus comprising circuitry configured to: sense at least one beam; initiate a channel occupancy time based on the sensing; transmit at least one first downlink transmission on the at least one beam during the channel occupancy time, wherein the at least one first downlink transmission on the at least one beam triggers at least one first uplink transmission on the at least one beam during the channel occupancy time; receive the at least one first uplink transmission on the at least one beam during the channel occupancy time; determine interference condition on the at least one beam based on the at least one first uplink transmission; and schedule at least one second downlink transmission or at least one second uplink transmission on the at least one beam with restriction during a rest of the channel occupancy time when the interference condition meets at least one threshold requirement, wherein the restriction restricts a number and/or a duration of the at least one second downlink transmission or a number and/or a duration of the at least one second uplink transmission.

Initiating a channel occupancy time based on the sensing may comprise: initiating a channel occupancy time when the sensing indicates that a channel on the at least one beam is idle during a listening period.

The at least one first downlink transmission may comprise downlink control information. The at least one first downlink transmission may comprise multiple first downlink transmissions. The at least one beam may comprise K beams and the at least one first downlink transmission comprises one first downlink transmission per beam. The at least one beam may comprise one beam and wherein the at least one first downlink transmission comprises K first downlink transmissions per beam. The multiple first downlink transmissions may be consecutive. The at least one first uplink transmission may comprise at least one of: uplink control information; and/or uplink data.

The at least one first uplink control transmission may comprise at least one of: a hybrid automatic repeat request acknowledgement; and/or a channel state channel state information report. The at least one second downlink transmission may comprise downlink data or the at least one second uplink transmission comprise uplink data. The number and/or duration of the at least one second downlink transmission or at least one second uplink transmission may be specific per beam.

The at least one first downlink transmission may addressed to multiple terminals; the at least one second downlink transmission may be addressed to the multiple terminals; the at least one first uplink transmission may be received from the multiple terminals; and/or the at least one second uplink transmission may be received from the multiple terminals. The number and/or duration of the at least one second downlink transmission or at least one second uplink transmission is specific per beam pair link.

The at least one first downlink transmission may be addressed to a terminal; the at least one second downlink transmission may be addressed to the terminal; the at least one first uplink transmission may be received from the terminal; and/or the at least one second uplink transmission may be received from the terminal. The at least one first downlink transmission may comprise a number of first downlink transmission lower than a predetermined maximum number. The interference condition may be: low; high; or very high;

The interference condition may be low when a quality metrics indicated by the at least one first uplink transmission is greater than a first threshold; the interference condition may be high when the quality metrics indicated by the at least one first uplink transmission is between the first threshold and a second threshold; and the interference condition may be very high when the quality metrics indicated by the at least one first uplink transmission is greater than the second threshold or no first uplink transmission is received.

The interference condition may be low when a quality metrics indicated by the at least one first uplink transmission is lower than a previous quality metrics indicated by at least one previous first uplink transmission by less than a first threshold or greater than the previous quality metrics indicated by at least one previous first uplink transmission and the quality metrics indicated by the at least one first uplink transmission is greater than a second threshold; the interference condition may be high when the quality metrics indicated by the at least one first uplink transmission is lower than the previous quality metrics indicated by at least one previous first uplink transmission by more than the first threshold and by less than a third threshold and the quality metrics indicated by the at least one first uplink transmission is greater than the second threshold; and the interference condition may be very high when the quality metrics indicated by the at least one first uplink transmission is lower than the previous quality metrics indicated by at least one previous first uplink transmission by more than the third threshold or the quality metrics indicated by the at least one first uplink transmission is lower than the second threshold or no first uplink transmission is received.

The quality metrics or the previous quality metrics may comprise a channel quality indicator, a reference signal received power or a ratio of positive acknowledgements over positive and negative acknowledgments.

The apparatus may comprise circuitry configured to: schedule at least second downlink transmission or at least one uplink transmission on the at least one beam during the rest of channel occupancy time without restriction when the interference condition is low; schedule at least second downlink transmission or at least one uplink transmission on the at least one beam during the rest of channel occupancy time with restriction when the interference condition is high; and schedule no second downlink transmission or at least one uplink transmission on the at least one beam during the rest of channel occupancy time when the interference condition is very high.

The restriction may comprise a maximum number and/or a maximum duration of the at least one second downlink transmission or a maximum number and/or a maximum duration of the at least one second uplink transmission.

The apparatus may be an access node. The at least one beam may comprise an access node reception beam and an associated access node transmission beam.

According to an aspect there is provided a method comprising: sensing at least one beam; initiating a channel occupancy time based on the sensing; transmitting at least one first downlink transmission on the at least one beam during the channel occupancy time, wherein the at least one first downlink transmission on the at least one beam triggers at least one first uplink transmission on the at least one beam during the channel occupancy time; receiving the at least one first uplink transmission on the at least one beam during the channel occupancy time; determining interference condition on the at least one beam based on the at least one first uplink transmission; and scheduling at least one second downlink transmission or at least one second uplink transmission on the at least one beam with restriction during a rest of the channel occupancy time when the interference condition meets at least one threshold requirement, wherein the restriction restricts a number and/or a duration of the at least one second downlink transmission or a number and/or a duration of the at least one second uplink transmission.

Initiating a channel occupancy time based on the sensing may comprise: initiating a channel occupancy time when the sensing indicates that a channel on the at least one beam is idle during a listening period. The at least one first downlink transmission may comprise downlink control information. The at least one first downlink transmission may comprise multiple first downlink transmissions. The at least one beam may comprise K beams and the at least one first downlink transmission comprises one first downlink transmission per beam.

The at least one beam may comprise one beam and wherein the at least one first downlink transmission comprises K first downlink transmissions per beam. The multiple first downlink transmissions may be consecutive. The at least one first uplink transmission may comprise at least one of: uplink control information; and/or uplink data.

The at least one first uplink control transmission may comprise at least one of: a hybrid automatic repeat request acknowledgement; and/or a channel state channel state information report. The at least one second downlink transmission may comprise downlink data or the at least one second uplink transmission comprise uplink data. The number and/or duration of the at least one second downlink transmission or at least one second uplink transmission may be specific per beam.

The at least one first downlink transmission may addressed to multiple terminals; the at least one second downlink transmission may be addressed to the multiple terminals; the at least one first uplink transmission may be received from the multiple terminals; and/or the at least one second uplink transmission may be received from the multiple terminals. The number and/or duration of the at least one second downlink transmission or at least one second uplink transmission is specific per beam pair link The at least one first downlink transmission may be addressed to a terminal; the at least one second downlink transmission may be addressed to the terminal; the at least one first uplink transmission may be received from the terminal; and/or the at least one second uplink transmission may be received from the terminal.

The at least one first downlink transmission may comprise a number of first downlink transmission lower than a predetermined maximum number. The interference condition may be: low; high; or very high;

The interference condition may be low when a quality metrics indicated by the at least one first uplink transmission is greater than a first threshold; the interference condition may be high when the quality metrics indicated by the at least one first uplink transmission is between the first threshold and a second threshold; and the interference condition may be very high when the quality metrics indicated by the at least one first uplink transmission is greater than the second threshold or no first uplink transmission is received.

The interference condition may be low when a quality metrics indicated by the at least one first uplink transmission is lower than a previous quality metrics indicated by at least one previous first uplink transmission by less than a first threshold or greater than the previous quality metrics indicated by at least one previous first uplink transmission and the quality metrics indicated by the at least one first uplink transmission is greater than a second threshold; the interference condition may be high when the quality metrics indicated by the at least one first uplink transmission is lower than the previous quality metrics indicated by at least one previous first uplink transmission by more than the first threshold and by less than a third threshold and the quality metrics indicated by the at least one first uplink transmission is greater than the second threshold; and the interference condition may be very high when the quality metrics indicated by the at least one first uplink transmission is lower than the previous quality metrics indicated by at least one previous first uplink transmission by more than the third threshold or the quality metrics indicated by the at least one first uplink transmission is lower than the second threshold or no first uplink transmission is received.

The quality metrics or the previous quality metrics may comprise a channel quality indicator, a reference signal received power or a ratio of positive acknowledgements over positive and negative acknowledgments.

The apparatus may comprise means for: scheduling at least second downlink transmission or at least one uplink transmission on the at least one beam during the rest of channel occupancy time without restriction when the interference condition is low; scheduling at least second downlink transmission or at least one uplink transmission on the at least one beam during the rest of channel occupancy time with restriction when the interference condition is high; and scheduling no second downlink transmission or at least one uplink transmission on the at least one beam during the rest of channel occupancy time when the interference condition is very high.

The restriction may comprise a maximum number and/or a maximum duration of the at least one second downlink transmission or a maximum number and/or a maximum duration of the at least one second uplink transmission.

The method may be performed by an access node. The at least one beam may comprise an access node reception beam and an associated access node transmission beam.

According to an aspect there is provided a computer program comprising computer executable code which when run on at least one processor is configured to: sense at least one beam; initiate a channel occupancy time based on the sensing; transmit at least one first downlink transmission on the at least one beam during the channel occupancy time, wherein the at least one first downlink transmission on the at least one beam triggers at least one first uplink transmission on the at least one beam during the channel occupancy time; receive the at least one first uplink transmission on the at least one beam during the channel occupancy time; determine interference condition on the at least one beam based on the at least one first uplink transmission; and schedule at least one second downlink transmission or at least one second uplink transmission on the at least one beam with restriction during a rest of the channel occupancy time when the interference condition meets at least one threshold requirement, wherein the restriction restricts a number and/or a duration of the at least one second downlink transmission or a number and/or a duration of the at least one second uplink transmission.

Initiating a channel occupancy time based on the sensing may comprise: initiating a channel occupancy time when the sensing indicates that a channel on the at least one beam is idle during a listening period.

The at least one first downlink transmission may comprise downlink control information. The at least one first downlink transmission may comprise multiple first downlink transmissions. The at least one beam may comprise K beams and the at least one first downlink transmission comprises one first downlink transmission per beam. The at least one beam may comprise one beam and wherein the at least one first downlink transmission comprises K first downlink transmissions per beam. The multiple first downlink transmissions may be consecutive.

The at least one first uplink transmission may comprise at least one of: uplink control information; and/or uplink data. The at least one first uplink control transmission may comprise at least one of: a hybrid automatic repeat request acknowledgement; and/or a channel state channel state information report. The at least one second downlink transmission may comprise downlink data or the at least one second uplink transmission comprise uplink data. The number and/or duration of the at least one second downlink transmission or at least one second uplink transmission may be specific per beam.

The at least one first downlink transmission may addressed to multiple terminals; the at least one second downlink transmission may be addressed to the multiple terminals; the at least one first uplink transmission may be received from the multiple terminals; and/or the at least one second uplink transmission may be received from the multiple terminals. The number and/or duration of the at least one second downlink transmission or at least one second uplink transmission is specific per beam pair link. The at least one first downlink transmission may be addressed to a terminal; the at least one second downlink transmission may be addressed to the terminal; the at least one first uplink transmission may be received from the terminal; and/or the at least one second uplink transmission may be received from the terminal. The at least one first downlink transmission may comprise a number of first downlink transmission lower than a predetermined maximum number.

The interference condition may be: low; high; or very high. The interference condition may be low when a quality metrics indicated by the at least one first uplink transmission is greater than a first threshold; the interference condition may be high when the quality metrics indicated by the at least one first uplink transmission is between the first threshold and a second threshold; and the interference condition may be very high when the quality metrics indicated by the at least one first uplink transmission is greater than the second threshold or no first uplink transmission is received.

The interference condition may be low when a quality metrics indicated by the at least one first uplink transmission is lower than a previous quality metrics indicated by at least one previous first uplink transmission by less than a first threshold or greater than the previous quality metrics indicated by at least one previous first uplink transmission and the quality metrics indicated by the at least one first uplink transmission is greater than a second threshold; the interference condition may be high when the quality metrics indicated by the at least one first uplink transmission is lower than the previous quality metrics indicated by at least one previous first uplink transmission by more than the first threshold and by less than a third threshold and the quality metrics indicated by the at least one first uplink transmission is greater than the second threshold; and the interference condition may be very high when the quality metrics indicated by the at least one first uplink transmission is lower than the previous quality metrics indicated by at least one previous first uplink transmission by more than the third threshold or the quality metrics indicated by the at least one first uplink transmission is lower than the second threshold or no first uplink transmission is received.

The quality metrics or the previous quality metrics may comprise a channel quality indicator, a reference signal received power or a ratio of positive acknowledgements over positive and negative acknowledgments.

The computer program may comprise computer executable code which when run on at least one processor is configured to: schedule at least second downlink transmission or at least one uplink transmission on the at least one beam during the rest of channel occupancy time without restriction when the interference condition is low; schedule at least second downlink transmission or at least one uplink transmission on the at least one beam during the rest of channel occupancy time with restriction when the interference condition is high; and schedule no second downlink transmission or at least one uplink transmission on the at least one beam during the rest of channel occupancy time when the interference condition is very high.

The restriction may comprise a maximum number and/or a maximum duration of the at least one second downlink transmission or a maximum number and/or a maximum duration of the at least one second uplink transmission. The at least one processor may be part of an access node. The at least one beam may comprise an access node reception beam and an associated access node transmission beam.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations
A-CSI: Aperiodic Channel State Information
AF: Application Function
AMF: Access Management Function
API: Application Protocol Interface
ATPC: Automatic Transmit Power Control
BS: Base Station
COT: Channel Occupancy time
CQI: Channel Quality Indicator
CU: Centralized Unit
DCI: Downlink Control information
DFS: Dynamic Frequency selection
DL: Downlink
DU: Distributed Unit
ED: Energy Detected
ETSI: European Telecommunications Standard Institute
gNB: gNodeB
GSM: Global System for Mobile communication
HARQ-ACK: Hybrid Automatic Request Acknowledgement
HSS: Home Subscriber Server
IoT: Internet of Things
L1-RSRP: Layer one Reference Signal Received Power
LBT: Listen Before Talk
LTE: Long Term Evolution
MAC: Medium Access Control
MS: Mobile Station
MTC: Machine Type Communication
NEF: Network Exposure Function
NF: Network Function
NR: New radio
NRF: Network function Repository Function
PDCCH: Physical Downlink Control Channel
PDSCH: Physical Downlink Shared Channel
PUCCH: Physical Uplink Control Channel
PUSCH: Physical Uplink Shared Channel
RAM: Random Access Memory
(R)AN: (Radio) Access Network
RF: Radio Frequency
ROM: Read Only Memory
RX: Reception
SINR: Signal to Noise Ratio
SMF: Session Management Function
NSSAI: Network Slice Selection Assistance Information
RTS-CTS: Request To Send-Clean To Send
TDM: Time Division Multiplexing
TR: Technical Report
TS: Technical Specification
TX: Transmission
UE: User Equipment
UL: Uplink
UMTS: Universal Mobile Telecommunication System
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 11 shows a schematic representation of an access node scheduling uplink transmissions or downlink transmissions.

DETAILED DESCRIPTION OF THE FIGURES soIn the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
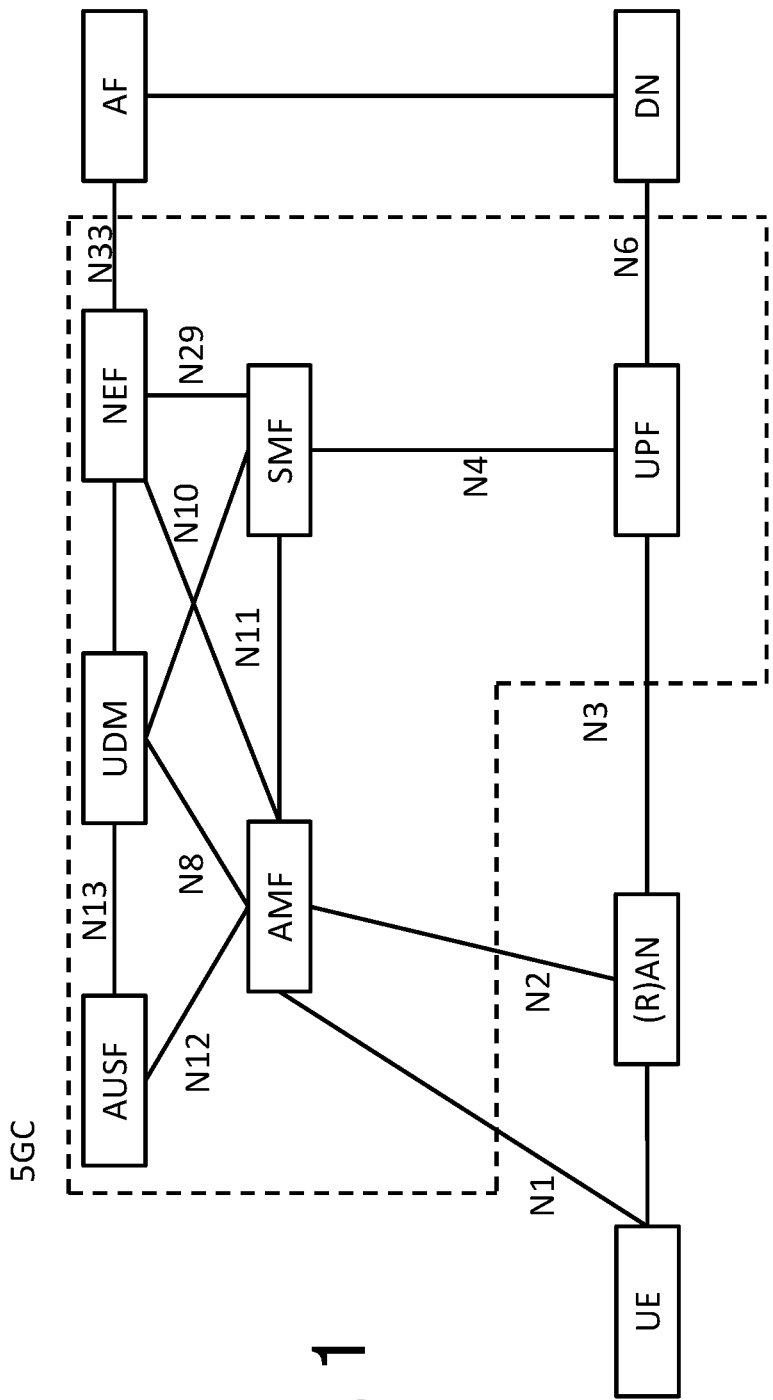
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF). Although not illustrated the 5GC may comprise other network functions (NF).

Figure 2:
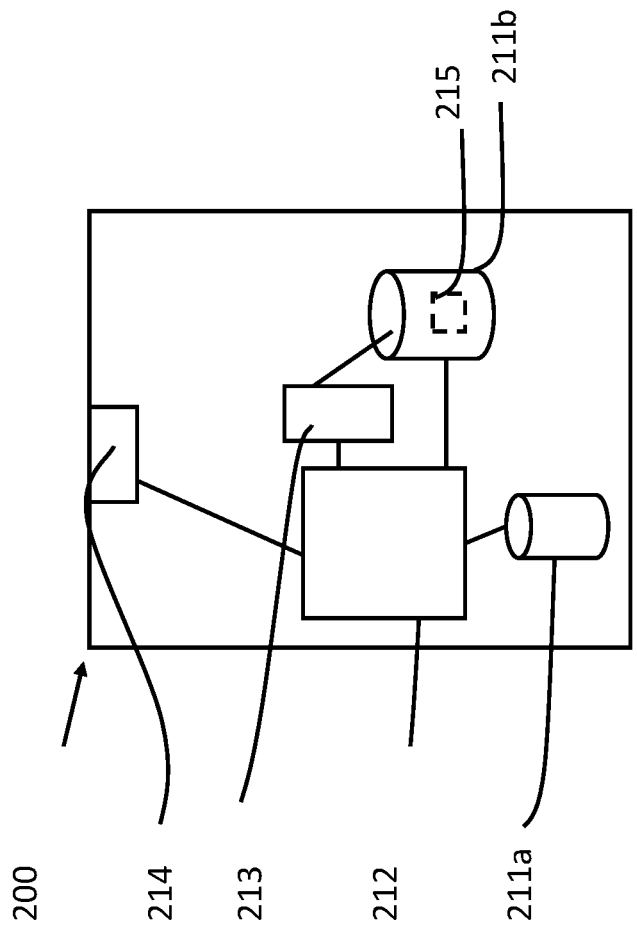
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211$a$, at least on read only memory (ROM) 211$b$, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
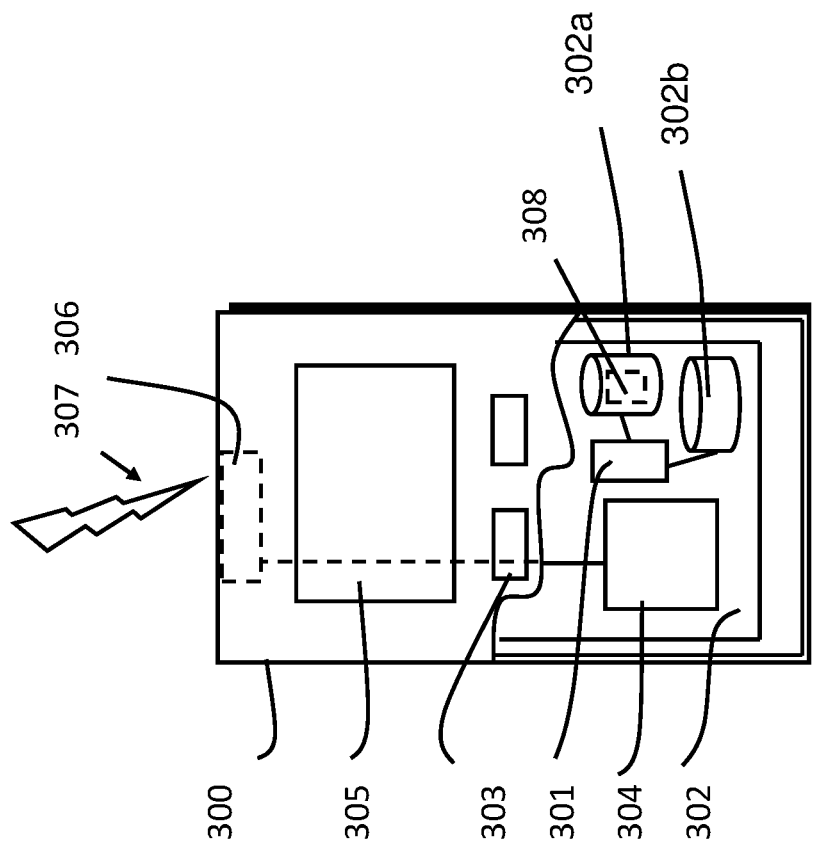
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to 60 GHz unlicensed frequency bands and, more specifically, to co-channel coexistence.

One or more aspects of this disclosure relate to this disclosure relate to 3GPP New Radio (NR) physical layer design as part of 3GPP RAN1 R17 SID [RP-193259] (Study on supporting NR from 52.6 GHz to 71 GHz) that was started in June 2020 RAN1#101e meeting. The objectives of the agreed study item are the following:

"Study of required changes to NR using existing DL/UL NR waveform to support operation between 52.6 GHz and 71 GHz
  Study of applicable numerology including subcarrier spacing, channel BW (including maximum BW), and their impact to FR2 physical layer design to support system functionality considering practical RF impairments [RAN1, RAN4].
  Identify potential critical problems to physical signal/channels, if any [RAN1].
Study of channel access mechanism, considering potential interference to/from other nodes, assuming beam based operation, in order to comply with the regulatory requirements applicable to unlicensed spectrum for frequencies between 52.6 GHz and 71 GHz [RAN1].
  Note: It is clarified that potential interference impact, if identified, may require interference mitigation solutions as part of channel access mechanism".

The regulations for 60 GHz unlicensed frequency bands may require the use of a spectrum sharing or co-channel coexistence mechanism but may not require any specific type of a mechanism. In some regions, separate regulatory requirements are defined for different use cases or deployments (e.g. for fixed outdoor equipment or point-to-point communications or for indoor-only use). However, European telecommunications standard institute (ETSI) harmonized standard EN 302 567 that targets for example indoor use and fulfils the corresponding European regulations and mandates the use of listen before talk (LBT). Correspondingly, RAN1 working group meeting #102e agreed that NR will support LBT on 60 GHz unlicensed frequency bands:
Agreement:
  "For gNB/UE to initiate a channel occupancy, both channel access with LBT mechanism(s) and a channel access mechanism without LBT are supported.
  FFS: LBT mechanisms such as Omni-directional LBT, directional LBT and receiver assisted LBT type of schemes when channel access with LBT is used.
  FFS: If operation restrictions for channel access without LBT are needed, e.g. compliance with regulations, and/or in presence of ATPC, DFS, long term sensing, or other interference mitigation mechanisms.
  FFS: The mechanism and condition(s) to switch between channel access with LBT and channel access without LBT (if local regulation allows)".

On 60 GHz unlicensed frequency bands signal attenuation may be faster than at lower frequency bands and therefore beam based operation may be necessary. Beamforming may partly be performed in analog domain, resulting in serving one or more beams in time division multiplexing (TDM) manner. Channel bandwidths may be extremely wide, in the order of couple of GHz.

Figure 4:
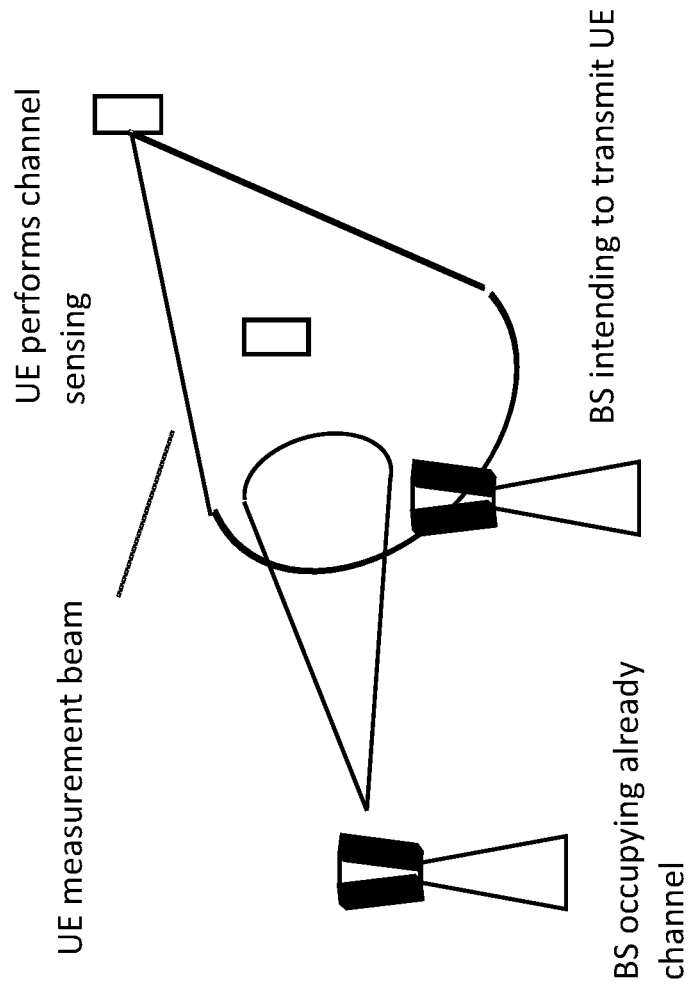
FIG. 4 shows a schematic representation of an access node intending to transmit to a terminal performing channel sensing in a beam-based system.

Due to narrow beam-based operation, channel sensing also on receiver may become more important than with omnidirectional antennas. This is illustrated in FIG. 4 where a receiver performs channel sensing and detects transmission from a BS different from the BS intending to transmit. The BS intending to transmit may not likely sense this transmission.

On the other hand, coexistence problem may be less severe than at lower frequency bands. The higher spatial isolation due to narrow beams and higher attenuation alleviates the coexistence problem when compared to omnidirectional operation within lower frequency bands (e.g. 2.4 GHz or 5 GHz frequency bands). Nevertheless, a portion of equipment may be in a position that is exposed to frequent interference.

Implementation impact of channel access may be emphasized. Extremely wide channel bandwidths may imply very high sampling, symbol and data rates, causing significant challenges for equipment implementation.

Round-trip time consisting of processing times of gNB and UE may be decreased (even though not linearly) with decreased slot length corresponding to increases in subcarrier spacing, such as 120 kHz, 240 kHz, 480 kHz or ~960 kHz in 60 GHz frequency bands compared to 15 kHz or 30 kHz subcarrier spacing used in 5 GHz frequency bands.

The above provide various reasons to consider receiver assistance in the channel access, while targeting reasonable implementation efforts. The implementation efforts may be in balance with the severity of coexistence problem, which is lighter at 60 GHz frequency band. That is, introduction of overly complicated channel access mechanisms may be avoided.

A request to send-clear to send (RTS-CTS) handshaking procedure is well known and implemented in IEEE 802.11/Wi-Fi. However, it may require fast exchange of specific messages and related measurements before actual transmission can start. This is not such a problem for IEEE 802.11/Wi-Fi based solutions designed for floating timing. However, NR processing times and scheduling mechanisms ("frame-based" operation) are not well suited for such RTS-CTS handshaking procedure. NR implementation would result in considerable handshaking latency, causing inefficient channel use and significant buffering requirements at the transmitter.

Various solutions may be implemented for reasonable implementation impact from channel access procedure at 60 GHz band Timing relation between channel occupancy measurement at a transmitter (e.g. gNB) and a receiver (e.g. terminal) and transmission is relaxed. From the receiver measurement viewpoint, the transmitter may start transmitting after transmitter energy detection (ED) listen before talk (LBT) but before receiver assisted hand-shaking procedure is completed. Further, the transmitter may have a longer gap between transmitter ED LBT and start of transmission. The transmitter may also serve multiple beams in time division multiplexing (TDM) manner within the same channel occupancy time (COT)—transmissions per beam is not continuous. To mitigate the relaxed timing between the channel occupancy measurement and transmission, periodic re-assessment of channel availability during the COT may be proposed:

The transmitter may periodically monitor channel availability or collisions during the COT. The receiver may periodically measure and report channel availability during the COT.

If channel occupancy is detected, the transmitter may end COT. However, the transmitter may for example signal transmission deferral time before ending COT or, with some probability, may continue transmission till next channel measurement time instance and even beyond if channel is measured vacant.

Various mechanisms may be implemented for smooth termination of the transmitter acquired COT based on transmitter channel measurement or on the feedback from the receiver. It can be seen as an alternative for the proposed solution. One problem may be that "potential damages" for the victim(s) are created first, while actions to avoid those are taken only after that. The proposed solution more allow more controlled operation already at the beginning of gNB acquired COT.

In the following the term "aspect" may refer to a feature that may be implement in some embodiments of the invention and that may not be implemented in other embodiments of the invention. It will therefore be understood the term "aspect" refers to an optional feature and not to an essential feature.

One or more aspects of this disclosure relate to terminal (receiver) assistance for scheduling UL transmission on a gNB RX beam or DL transmissions on an associated gNB TX beam during a channel occupancy time (COT). Instead of defining a RTS-CTS like handshaking procedure according to predefined reference signals, the existing NR scheduling mechanisms may be used for obtaining receiver assistance for channel access.

In this disclosure a gNB RX beam and an associated gNB TX beam may be referred jointly as a beam.

The scheduling of UL transmission on a gNB RX beam or DL transmissions on an associated gNB TX beam during a COT may be performed in two separate phases.

In a first phase of the COT the gNB may perform LBT on a gNB RX beam. The gNB may schedule DL transmissions on the associated gNB TX beam on "selected" scheduling opportunities or "default" scheduling opportunities. Scheduling opportunities in this disclosure may mean the possibilities, rules, or restrictions set on scheduling e.g. in terms of the number of transmissions, duration of transmission, and/or power of transmission. The actual scheduling is determined based on these scheduling opportunities and e.g. on the amount and type of data to be transmitted. The scheduling in the first phase may be based on channel access acquired based only on the LBT on the gNB RX beam at.

The DL transmissions on the associated gNB TX beam may trigger UL transmissions on the gNB RX beam. The DL transmissions may comprise a number K of DL transmissions. K may be an integer equal to or greater than one. The DL transmissions may comprise downlink control information and/or downlink data. The UL transmissions may comprise a number K of UL transmissions. The number K of DL or UL transmissions may occur per beam or may occur on K gNB beams, with one transmission per beam. The UL transmissions may comprise uplink control information and/or uplink data. The uplink control information may comprise a hybrid automatic request acknowledgement (HARQ-ACK), aperiodic channel state information (A-CSI) or other.

In a second phase the gNB may schedule UL transmissions on the gNB RX beam or DL transmissions on the associated gNB TX beam on "full" scheduling opportunities or "limited" scheduling opportunities or may not schedule UL transmissions on the gNB RX beam or DL transmissions on the associated gNB TX beam.

In this disclosure the expression "selected" or "default" scheduling opportunities may refer to scheduling opportunities with possible restrictions. The possible restrictions may restrict an overall (DL and/or UL) transmission time on the associated beam or beam pair link and/or a number of transmissions (K). In an option, allowed transmission power may be additionally reduced from a normal maximum transmission power. For K DCIs, the overall duration of transmissions (PDCCH, PUCCH, PDSCH and PUSCH) may be be limited.

In this disclosure the expression "full" scheduling opportunities may refer to scheduling opportunities without restrictions.

In this disclosure the expression "limited" scheduling opportunities may refer to scheduling opportunities with restrictions in terms of transmission duration, number of transmission and/or limited average transmission duty cycle.

The scheduling in the second phase may be based on an interference condition on the gNB RX beam or an interference conditions on the associated gNB TX beam. The interference condition on the gNB RX beam or interference conditions on the associated gNB TX beam may be determined based on the UL transmissions on the gNB RX beam triggered by the DL transmissions on the gNB TX beam during the first phase. Therefore, the scheduling or channel access in the second phase may be based on both LBT at the gNB and interference condition at the terminal.

The gNB may serve multiple beams within the COT. The first phase and/or the second phase of the COT phase may be specific to a beam, that is specific to a gNB Rx beam and an associated gNB Tx beam.

The gNB may serve multiple beam pair links within the COT. The first phase and/or the second phase of the COT phase may be specific to a beam pair link. In this disclosure, a gNB Rx beam, an associated gNB Tx beam and a terminal Rx beam and an associated terminal Tx beam may be referred jointly as a beam pair link The first phase and/or the second phase of the COT may be determined separately for each gNB Rx beam and associated gNB Tx beam. The first phase and/or the second phase of the COT may be determined only for a gNB Rx beam and an associated gNB Tx beam known to frequently suffer from coexistence issues or from high interference at terminal Rx beam or from high interference variation at terminal Rx beam.

The first phase and/or the second phase of the COT may be determined separately for each beam pair link. The first phase and/or the second phase of the COT may be determined only for a beam pair link known to frequently suffer from coexistence issues or from high interference at terminal Rx beam or from high interference variation at terminal Rx beam.

The interference conditions may be determined separately for each gNB Rx beam and associated gNB Tx beam. The interference conditions may be determined only for a gNB Rx beam and an associated gNB Tx beam known to frequently suffer from coexistence issues or from high interference at terminal Rx beam or from high interference variation at terminal Rx beam.

The interference conditions may be determined separately for each beam pair link. The interference conditions may be determined only for a beam pair link known to frequently suffer from coexistence issues or from high interference at terminal Rx beam or from high interference variation at terminal Rx beam.

The duration of the first phase may be determined based on the number (e.g. K) of DL transmissions on an associated gNB Tx beam (e.g. K DL transmissions on one beam) or on associated gNB Tx beams (e.g. one DL transmission per beam on K beams). The duration of the first phase may not have a fixed/predetermined duration. In this way, a gNB may have more flexibility in COT structure design. The first phase may end once UL transmissions on the gNB Rx beam triggered by the DL transmissions on the associated gNB Tx beam are received and/or when interference condition is determined by the gNB. In this way a gNB may schedule DL transmissions on different UL transmissions on different gNB RX beams or DL transmissions on different associated gNB TX beams with more flexibility.

When the first phase and second phase of the COT and/or interference condition is determined per gNB Rx beam and associated gNB Tx beam (and not per beam pair link) the UL transmissions may be received on the gNB Rx beam from multiple UEs served by the same gNB Rx beam and associated gNB Tx beam.

When the first phase and second phase of the COT and/or interference condition is determined per beam pair link the UL transmissions may be received on the gNB Rx beam from a single UE served by the beam pair link.

The COT may be available for scheduling UL transmissions on a gNB Rx beam or DL transmissions on a gNB Tx beam. The first phase and second phase and interference conditions may be determined for both link directions (i.e. gNB Rx beam and associated gNB Tx beam) or only for one link direction (i.e. gNB Rx beam or associated gNB Tx beam).

Figure 5:
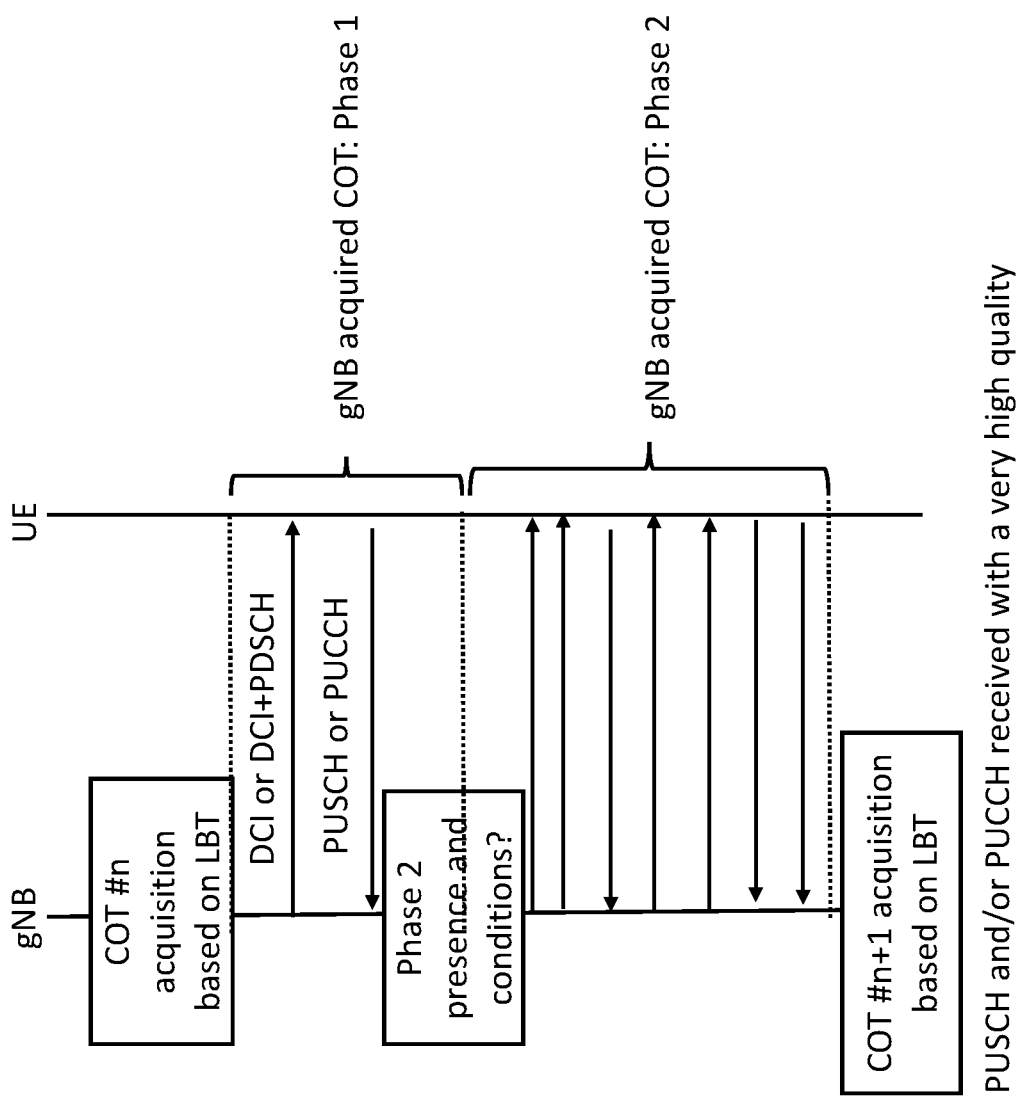
FIG. 5 shows a signalling diagram of a process for scheduling uplink transmissions or downlink transmissions when interference condition is low or high.

FIG. 5 shows a signalling diagram of a process for scheduling UL transmissions or DL transmissions in a communication system when a low interference condition is determined on the UL or the DL.

A gNB may sense a gNB Rx beam and may initiate a COT #N for the gNB Rx beam and an associated gNB Tx beam based on the sensing. For example, if the channel sensed with gNB Rx beam is idle or vacant during a listen period the gNB may intitiate the COT #N. Otherwise, the gNB may not initiate the COT #N. In this case, the gNB may continue sensing to find a new starting time for the COT#N.

The gNB may schedule DL transmissions on the associated gNB Tx beam. The DL transmission may be addressed to a UE. The DL transmissions on the associated gNB Tx beam may trigger UL transmissions on the gNB Rx beam. The gNB may receive the UL transmissions on the gNB Rx beam from the UE.

The gNB may determine an interference condition on the gNB Rx beam and/or interference condition on the associated gNB Tx beam. Here, the gNB may determine that the interference condition on the gNB Rx beam and/or the interference condition on the associated gNB Tx beam may be a low interference condition or expected interference condition (i.e. UL transmissions on the gNB Rx beam and/or DL transmissions on the associated gNB Tx beam have been received with a very high quality or quality corresponding to previously reported channel state information).

The gNB may schedule UL transmissions on the gNB Rx beam and/or DL transmissions on the associated gNB Tx beam on "full" scheduling opportunities.

Alternatively, the gNB may determine that the interference condition on the the gNB Rx beam and/or the interference condition on the associated gNB Tx beam may be a high interference condition or increased interference condition (i.e. UL transmissions on the gNB Rx beam and/or DL transmissions on the associated gNB Tx beam have been received with a low quality or quality deteriorated from the previously reported channel state information).

The gNB may schedule UL transmissions on the gNB Rx beam and/or DL transmissions on the associated gNB Tx beam on "limited" scheduling opportunities.

The gNB may repeat the above.

The gNB may sense a gNB Rx beam and may initiate a COT #N+1 for the gNB Rx beam and the associated gNB Tx beam based on the sensing and so on.

Figure 6:
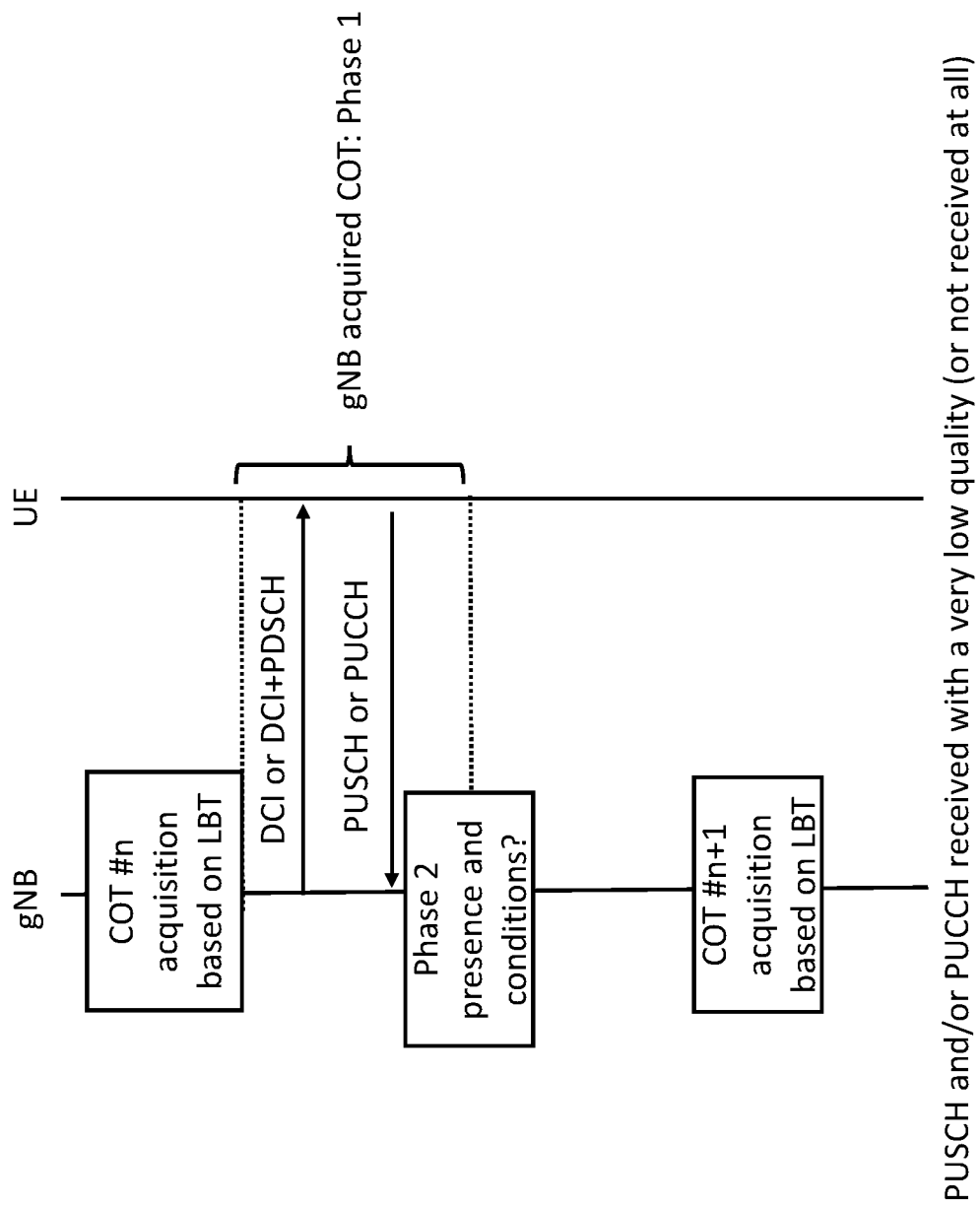
FIG. 6 shows a signalling diagram of a process for scheduling uplink transmissions or downlink transmissions when interference condition is very high.

FIG. 6 shows a signalling diagram of a process for scheduling UL transmissions or DL transmissions when a very high interference condition is determined on the UL or the DL.

A gNB may sense a gNB Rx beam and may initiate a COT #N for the gNB Rx beam and an associated gNB Tx beam based on the sensing. For example, if the channel sensed with the gNB Rx beam is idle or vacant during a listen period the gNB may initiate the COT #N. Otherwise, the gNB may not initiate the COT #N. Again, in this case, the gNB may continue sensing to find a new starting time for the COT#N.

The gNB may shedule DL transmissions on the associated gNB Tx beam. The DL transmission may be addressed to a UE. The DL transmissions on the associated gNB Tx beam may trigger UL transmissions on the gNB Rx beam.

The gNB may receive the UL transmissions on the gNB Rx beam from the UE.

The gNB may determine an interference condition on the associated gNB Rx beam and/or an interference condition on the gNB Tx beam. Here, the gNB may determine that the interference condition on the gNB Rx beam and/or the interference condition on the associated gNB Tx beam may be a very high interference condition or significantly increased interference condition (i.e. on the UL transmissions on the gNB Rx beam and/or DL transmissions on the associated gNB Tx beam have been received with a very low quality or quality significantly deteriorated from the previously reported channel state information or the gNB does not receive the triggered UE transmission at all).

The gNB may not schedule UL transmissions on the gNB Rx beam and/or DL transmissions on the gNB Tx beam on any scheduling opportunities.

The gNB may repeat the above.

The gNB may sense a gNB Rx beam and may initiate a COT #N+1 for the gNB Rx beam and the associated gNB Tx beam based on the sensing and so on.

As explained above the gNB may initiate a COT based on LBT sensing at the gNB. The sensing may cover a gNB Rx beam or more than one gNB Rx beams. The LBT sensing may use a beam that covers radiation directions of the gNB Rx beam or more than one gNB Rx beams.

In the first phase of the COT the gNB may transmit DL transmissions (e.g. K DCIs) on the gNB Tx beam associated with the gNB Rx beam. Each DL transmission on the gNB Tx beam triggers an UL transmission on the gNB Rx beam.

The gNB may schedule the DL transmissions on "selected" scheduling opportunities freely within the COT or on "default" scheduling opportunities. The overall duration of the DL transmissions and/or UL transmissions may be lower than a predetermined maximum duration. The number of DL transmissions and/or UL transmissions may be lower than a predetermined maximum number.

The UL transmissions may comprise a HARQ-ACK feedback for a physical downlink shared channel (PDSCH) on a physical uplink shared channel (PUSCH) or a physical uplink control channel (PUCCH), a "regular" aperiodic channel state information (A-CSI) report or a "specific" channel state information (CSI) report or UL data on PUSCH.

The first phase may be specific for a beam pair link associated with single UE or may be specific for a gNB Rx beam and an associated gNB Tx beam. In the latter case, the DL transmissions may be addressed to multiple UEs served by the gNB Rx beam and associated gNB Tx beam. In other words, the gNB may carry out the first phase seperately for each of its gNB Rx beam and associated Tx beam.

The gNB may receive the triggered UL transmissions via the gNB Rx beam. The gNB may determine based on the UL transmissions an estimate of the current interference condition experienced by one or more UEs served by the gNB Rx beam or the gNB Rx beam. The gNB may determine based on the UL transmissions an estimate of the current interference conditions experience by a UE served by the gNB Rx beam or the gNB Rx beam as part of a beam pair link.

In the second phase the gNB may schedule UL transmissions on the gNB Rx beam or DL transmissions on the gNB Tx beam based on the interference condition on the gNB Rx beam or the interference condition on the gNB Rx beam.

Additionally, the gNB may determine a backoff (i.e. the earliest starting time for the COT#N+1) based on the interference conditions of gNB acquired COT#N in the first phase.

Figure 7:
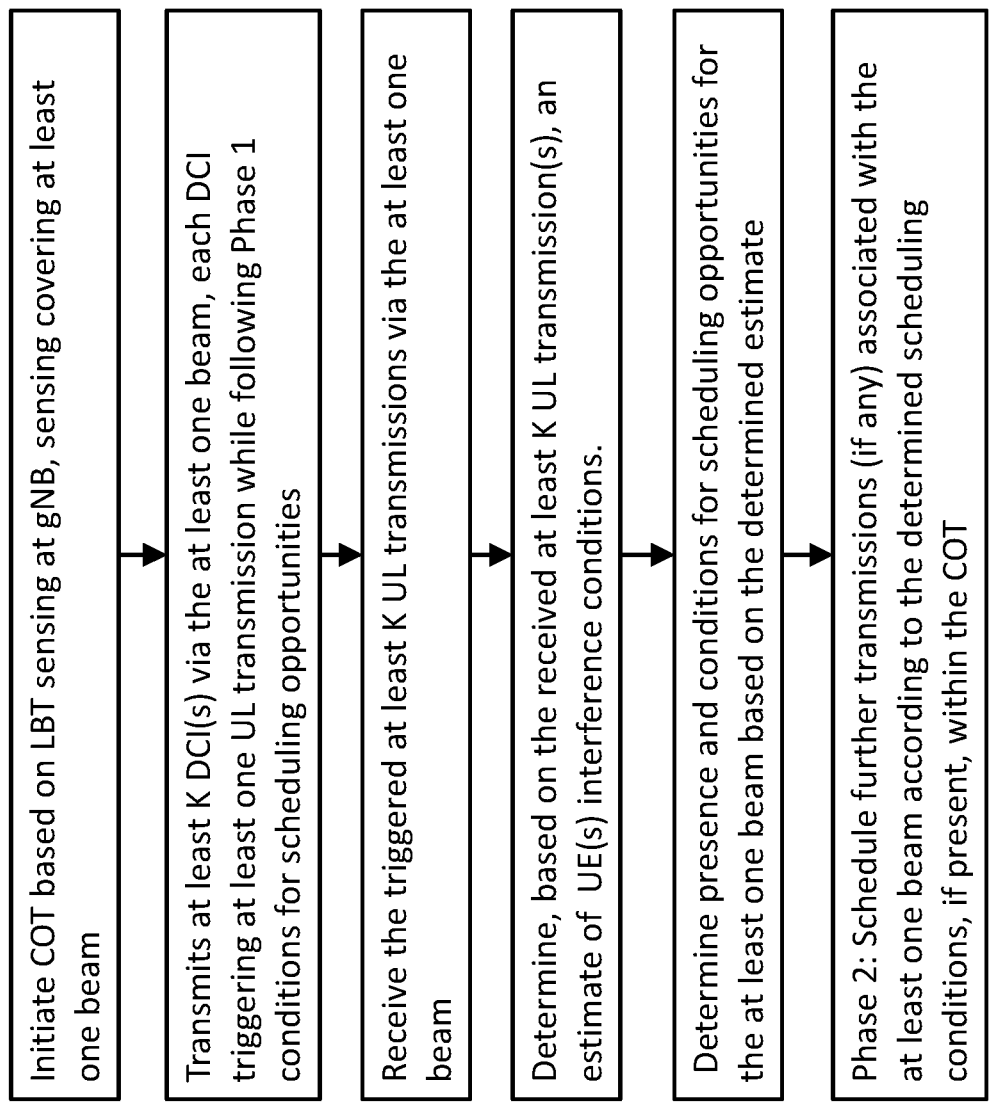
FIG. 7 shows a block diagram of a method for scheduling uplink transmissions and/or downlink transmissions.

FIG. 7 shows a block diagram of a method for scheduling UL transmissions and/or DL transmissions.

The gNB may initiate a COT based on LBT sensing at the gNB. The LBT sensing may cover at least one beam More specifically, each beam may comprise a gNB RX beam and an associated gNB TX beam. The LBT sensing may cover at least one gNB Rx beam.

In a first phase the gNB may schedule and transmit at least K DCI(s) on the at least one beam. More specifically, the gNB may schedule and transmit at least K DCI(s) on at least one gNB Tx beam. Each DCI may trigger at least one UL transmission on the at least one gNB Rx beam.

In the first phase the gNB may attempt to receive and receive the at least K UL transmission on the at least one beam. More specifically, the gNB may attempt to receive and receive the at least K UL transmission on the at least one gNB Rx beam. The gNB may determine, based on the received at least K UL transmissions, an estimate of UE(s) inteference conditions. The gNB may determine presence and conditions for scheduling opportunities for the at least one beam based on the estimate of UE(s) inteference conditions. More specifically, the gNB may determine presence and conditions for scheduling opportunities for the at least one gNB Rx beam and/or the at least one gNB Tx beam.

Here, the term "presence" may refer to whether UL transmissions and/or DL transmissions are to be scheduled in the second phase. The term "conditions" may refer to a duration, a backoff before the next COT, a maximum transmission power, a power spectral density, a maximum effective radiated power (EIRP), a minimum antenna gain or other.

In a second phase the gNB may schedule further transmissions (if any) associated with the at least one beam according to the determined conditions, if present, within the COT. More specifically, the gNB may schedule further transmissions (if any) associated with the at least one gNB Rx beam and/or with the at least one gNB Tx beam.

Figure 8:
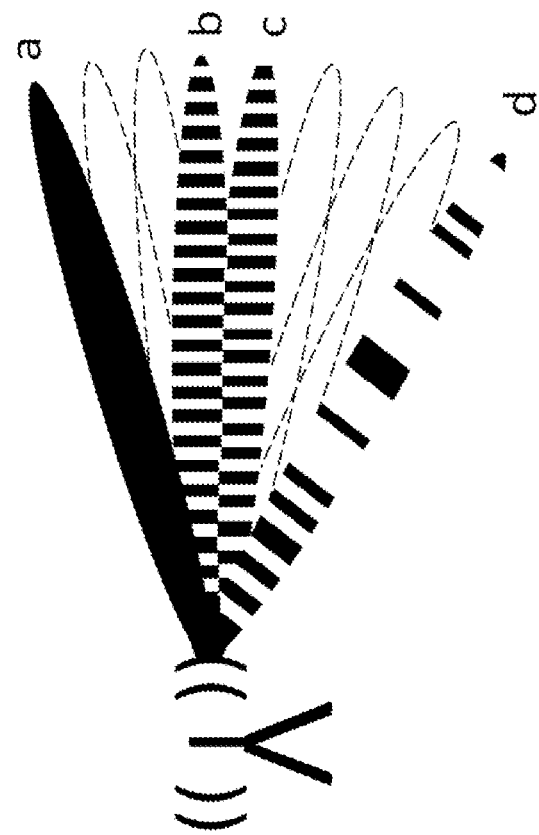
FIG. 8 shows a schematic representation of an access node scheduling uplink transmissions or downlink transmissions in a first phase of a channel occupancy time.

FIG. 8 illustrates an example of gNB operation during the first phase. The gNB has initiated a COT for a sub-set of beams (a, b, c, d). In this example, beam a only infrequently experiences high or very high coexistence interference and, hence, no terminal or receiver assistance is used on that beam. Channel access on beam a (and associated beam pair links) may be based solely on gNB energy detection LBT.

Beams b, c, and d use terminal assistance for determining channel access. The striped pattern on the beams illustrates (schematically) the transmissions within the beam in time domain. During the first phase, the total transmission time on the beam may be restricted. The transmission do not need to follow any specific pattern, as illustrated on beam d.

Figure 9:
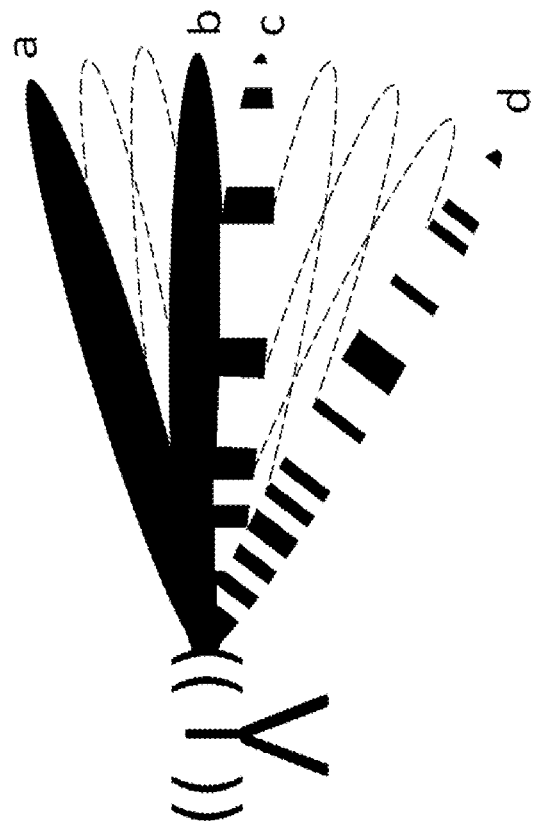
FIG. 9 shows a schematic representation of an access node scheduling uplink transmissions or downlink transmissions in a first phase and a second phase of a channel occupancy time.

FIG. 9 illustrates an example of gNB operation during the first phase and the second phase. Beams a and d are in the first phase. Beams b and c are in the second phase.

As low coexistence interference is determined on beam b "full" scheduling can be performed on beam b for the rest of the COT. As high coexistence interference is determined on beam c "limited" scheduling can be performed on beam c for the rest of the COT (e.g. transmission duration may be reduced and/or average transmission duty cycle reduced). Beam d remains in the first phase, illustrating that the first phase is bounded by a number of triggered UL transmissions, not by a predetermined time portion of the COT.

Figure 10:
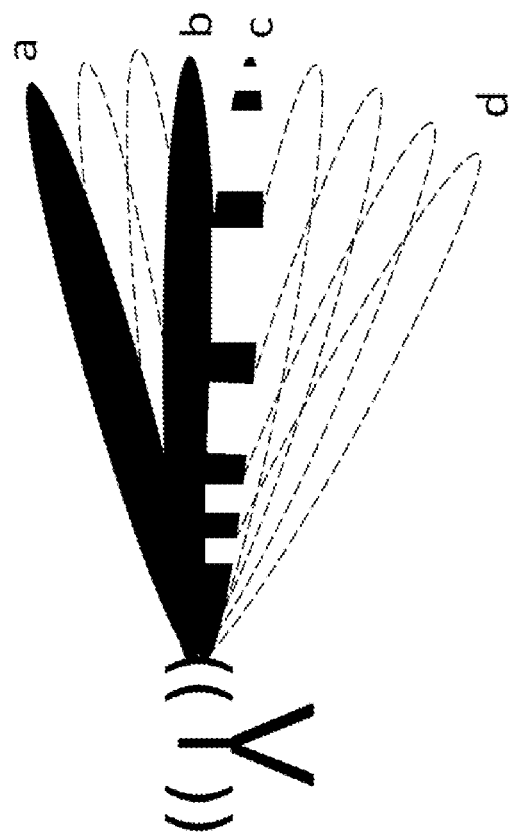
FIG. 10 shows a schematic representation of an access node scheduling uplink transmissions or downlink transmissions in a second phase of a channel occupancy time.

On FIG. 10 illustrates an example of gNB operation during the second phase. Beams a, b, c, and d are in the second phase. As very high coexistence interference is determined on beam d no scheduling can be performed on beam d for the rest of the COT.

A DCI message may schedule a PDSCH (triggering HARQ-ACK feedback) or a PUSCH. A DCI message may also trigger a transmission of A-CSI report or a CSI report tailored for channel access measurement. For example in case of CSI report, three categorizations of inteference may be defined:

Interference at UE may be considered low (or normal) if a reported channel quality indicator (CQI) or layer one reference signal received power (L1-RSRP) has not degraded too much since a previous reported CQI or L1-RSRP (less than a first predetermined threshold) and is above a second threshold. The second threshold may reflect channel and interference conditions in absolute terms (e.g. as a supported CQI index or an RSRP or signal to noise ratio (SINR) value) not only relative to a previous reported a previous reported CQI or L1-RSRP.

Interference at UE may be considered to be high (or considerable) if the reported CQI or L1-RSRP has degraded by more than the first threshold but less than a third threshold and is above a second threshold Interference at UE may be considered to be very high (or significant) if the reported CQI or L1-RSRP has degraded by more than a third threshold or is below the second threshold or CQI or L1-RSRP is reported (indicating a possible failure in PDCCH (DCI) detection).

A tailored CSI report may for example be 2-bit report indicating interference conditions (averaged over the active bandwidth part) relative to a last previous "regular" CSI report, which reflects interference conditions for PDSCH reception. Additionally or alternatively, the tailored CSI report may indicate interference conditions relative to a LBT threshold, which reflects interference conditions for a PUSCH transmission. For example, the above categorization to low (or normal), high (or considerable) and very high (significant) interference conditions may be reported. A very high (or significant) interference condition may also be reported if channel energy detection exceeds the LBT threshold or if the triggered CSI is not received at all (inidicating PDCCH detection failure).

In case of HARQ-ACK feedback, ACK and NACK may be considered to reflect low (or normal) and higj (or considerable) interference condition. A missing HARQ ACK feedback (discontinuous transmission) may be considered to reflect a very high (significant) interference condition (possibly indicating PDCCH detection failure). In case of multiple HARQ ACK feedbacks, condition may be determined based on the ratio of NACKs or DTXs from all HARQ ACK feedbacks (DTXs may be weighted more than NACKs). Specific ratio-thresholds may be predetermined and associated to different interference conditions.

In case that CSI reports or HARQ-ACK feedback are received from multiple UEs for the same gNB Rx beam and associated gNB Tx beam, the interference condition for the gNB Rx beam and associated gNB Tx beam may be determined based on a worst UE interference condition or based on a median UE interference condition.

In the first phase of the COT the overall duration of DL transmissions on the gNB Tx beam and/or UL transmissions on the gNB Rx beam may be restricted. The number of DL transmissions on the gNB Tx beam and/or UL transmissions on the gNB Rx beam may be restricted (e.g. K). The allowed Tx power for DL transmissions on the gNB Tx beam and/or UL transmissions on the gNB Rx beam may be reduced from from a normal maximum Tx power. For K DCIs, the overall duration of transmissions (PDCCH, PUCCH, PDSCH and PUSCH) may be limited. Such limit may be for example based on a maximum number of slots-repetitions per one DCI, which currently 8 in NR.

In the second phase of the COT if the interference condition determined based on the UL transmissions on the gNB Rx beam received in the first phase is a low (or normal) interference condition, the gNB may shedule DL transmissions on the gNB Tx beam and/or UL transmissions on the gNB Rx beam without restrictions. If the interference condition determined based on the UL transmissions on the gNB Rx beam received in the first phase is a high (or considerable) interference condition, the gNB may shedule DL transmissions on the gNB Tx beam and/or UL transmissions on the gNB Rx beam with restrictions. If the interference condition determined based on the UL transmissions on the gNB Rx beam received in the first phase is a very high (or normal) interference condition, the gNB may not shedule DL transmissions on the gNB Tx beam and/or UL transmissions on the gNB Rx beam. The restriction may comprise a reduced Tx durations and/or a limited average Tx duty cycle and/or increase backoff (i.e. delaying the earliest starting time for the next COT).

It will be understood that although in the above three categories of interference conditions have been used more or less than three categories can be used.

FIG. 11 shows a schematic representation of a gNB scheduling DL transmissions on gNB Tx beams or UL transmissions on gNB Rx during a COT.

The gNB may serve a first gNB Tx beam and an associated first gNB Rx referred to as beam b1, a second gNB Tx beam and an associated second gNB Rx referred to as beam b2, a third gNB Tx beam and an associated third gNB Rx referred to as beam b3, a fourth gNB Tx beam and an associated fourth gNB Rx referred to as beam b4 and a fifth gNB Tx beam and an associated fifth gNB Rx referred to as beam b5 during the COT.

The gNB may schedules A-CSI for beams b1, b2, b3, b4 and b5 with a DCI. The gNB may receive the A-CSI from the UE for beams b1, b2, b3, b4 and b5, and based on the A-CSI the gNB may determine that DL tramsmissions or UL transmissions on beams b2 and b4 cannot be further scheduled due to very high (or significant) interference condition. For beam b3, the gNB may determine that DL tramsmissions or UL transmissions on beam b3 may be further scheduled with restrictions due to high (or significant) interference condition. The gNB may serve beam b3 for more DL transmissions or UL transmissions until a maximum number of DL transmissions or UL transmissions is reached (e.g. one more DCI transmission and two more data transmissions). For beam b1, the gNB may determine that DL tramsmissions or UL transmissions on beam b2 and beam b4 may be further scheduled without restrictions due to low (or normal) interference condition. The gNB may serve beam b1 for DL transmission or UL transmissions until it runs out of data for beam b1.

One or more aspects of this disclosure are advantageous in that terminal (receiver) assistance may be incorporated to channel access mechanism while having acceptable implementation impact.

One or more aspects of this disclosure are advantageous in that demanding low-latency signalling structures for RTS-CTS like handshaking procedures as well as related channel access delays may be avoided.

One or more aspects of this disclosure are advantageous in that fair coexistence may be facilitated whilst maintaining possibility for flexible scheduling for example between the beams.

Figure 12:
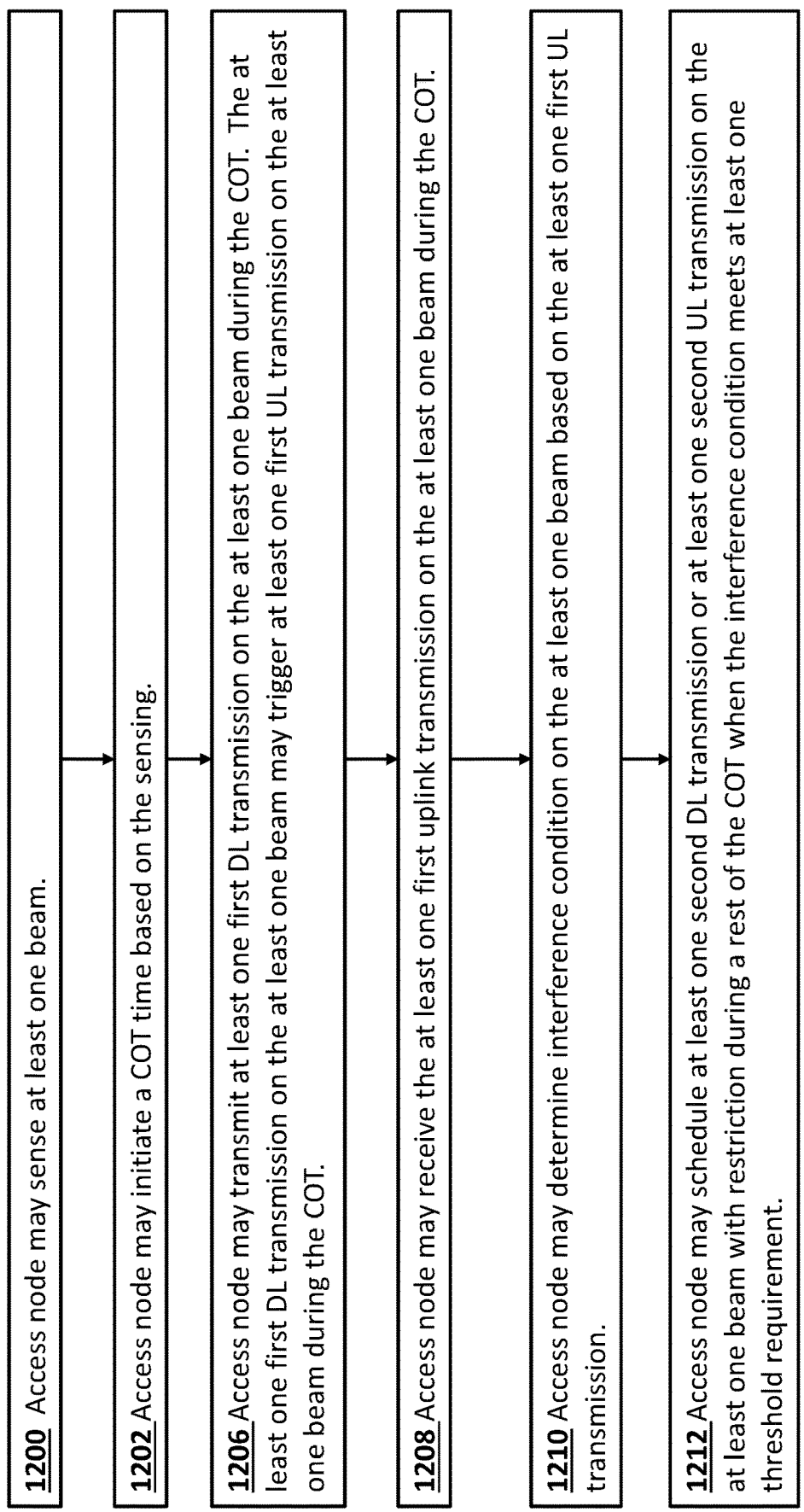
FIG. 12 shows a block diagram of a method for scheduling uplink transmission or downlink transmissions.

FIG. 12 shows a block diagram of a method for scheduling DL transmissions or UL transmissions in a communication system. The method may be performed by an access node (e.g. gNB).

In step 1200, the access node may sense at least one beam. The at least one beam may comprise an access node reception beam and an associated access node transmission beam. In step 1202, the access node may initiate a COT based on the sensing. The access node may initiate a COT when the sensing indicates that a channel on the at least one beam is idle during a listening period. In step 1204, the access node may transmit at least one first DL transmission on the at least one beam during the COT. The at least one first DL transmission on the at least one beam may trigger at least one first UL transmission on the at least one beam during the COT.

The at least one first DL transmission may comprise DCI. The at least one first UL control transmission may comprise at least one of: a HARQ ACK; and/or a CSI report. The at least one first DL transmission may comprise multiple first DL transmissions. The at least one beam may comprise K beams and the at least one first DL transmission may comprise one first DL transmission per beam. The at least one beam comprises one beam and wherein the at least one first DL transmission may comprise K first DL transmissions per beam. The multiple first DL transmissions may be consecutive. The at least one first UL transmission may comprise at least one of: uplink control information; and/or uplink data. The at least one first DL transmission may comprise a number of first DL transmission lower than a predetermined maximum number.

In step 1206, the access node may receive the at least one first UL transmission on the at least one beam during the COT. In step 1208, the access node may determine interference condition on the at least one beam based on the at least one first UL transmission.

In step 12010, the access node may schedule at least one second DL transmission or at least one second uplink transmission on the at least one beam with restriction during a rest of the COT when the interference condition meets at least one threshold requirement.

The restriction may restrict a number and/or a duration of the at least one second DL transmission or a number and/or a duration of the at least one second UL transmission. The restriction may comprise a maximum number and/or a maximum duration of the at least one second DL transmission or a maximum number and/or a maximum duration of the at least one second UL transmission. The at least one second downlink transmission may comprise DL data or the at least one second UL transmission comprise UL data.

The number and/or duration of the at least one at least one second DL transmission or at least one second UL transmission may be specific per beam. The at least one first DL transmission may be addressed to multiple terminals. The at least one second DL transmission may be addressed to the multiple terminals. The at least one first UL transmission may be received from the multiple terminals. The at least one second UL transmission may be received from the multiple terminals.

The number and/or duration of the at least one second DL transmission or at least one second UL transmission may be specific per beam pair link. The at least one first DL transmission may be addressed to a terminal. The at least one second DL transmission may be addressed to the terminal. The at least one first UL transmission may be received from the terminal. The at least one second UL transmission may be received from the terminal.

The interference condition may be low, high, or very high.

The interference condition may be low when a quality metrics indicated by the at least one first UL transmission is greater than a first threshold. The interference condition may be high when the quality metrics indicated by the at least one first UL transmission is between the first threshold and a second threshold. The interference condition may be very high when the quality metrics indicated by the at least one first UL transmission is greater than the second threshold or no first UL transmission is received.

The interference condition may be low when a quality metrics indicated by the at least one first UL transmission is lower than a previous quality metrics indicated by at least one previous first UL transmission by less than a first threshold or greater than the previous quality metrics indicated by at least one previous first UL transmission and the quality metrics indicated by the at least one first UL transmission is greater than a second threshold. The interference condition is high when the quality metrics indicated by the at least one first UL transmission is lower than the previous quality metrics indicated by at least one previous first UL transmission by more than the first threshold and by less than a third threshold and the quality metrics indicated by the at least one first UL transmission is greater than the second threshold. The interference condition may be very high when the quality metrics indicated by the at least one first UL transmission is lower than the previous quality metrics indicated by at least one previous first UL transmission by more than the third threshold or the quality metrics indicated by the at least one first UL transmission is lower than the second threshold or no first UL transmission is received.

The quality metrics or the previous quality metrics comprises one or more of a CQI, a RSRP or a ratio of ACKs over ACKs and NACKs.

The access node may schedule at least one second DL transmission or at least one UL transmission on the at least one beam during the rest of COT without restriction when the interference condition is low. The access node may schedule at least second DL transmission or at least one UL transmission on the at least one beam during the rest of COT with restriction when the interference condition is high. The access node may schedule no second DL transmission or at least one UL transmission on the at least one beam during the rest of COT when the interference condition is very high.

Figure 13:
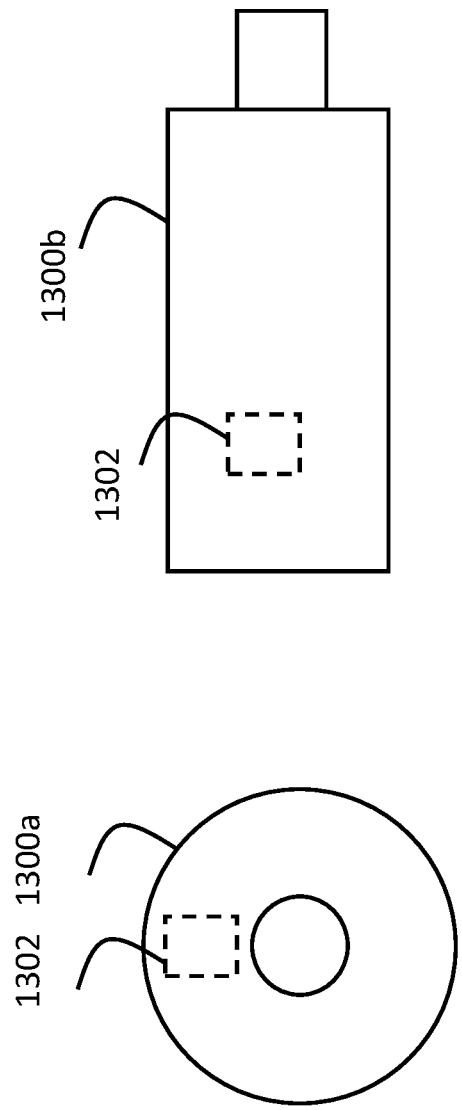
FIG. 13 shows a schematic representation of a non-volatile memory medium storing instructions which when executed by a processor allow a processor to perform one or more of the steps of the method of FIG. 12.

FIG. 13 shows a schematic representation of non-volatile memory media 1300*a* (e.g. computer disc (CD) or digital versatile disc (DVD)) and 1300*b* (e.g. universal serial bus (USB) memory stick) storing instructions and/or parameters 1302 which when executed by a processor allow the processor to perform one or more of the steps of the methods of FIG. 12.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other communication systems (3GPP or non-3GPP such as Wi-Fi or other).

It will also be understood that although the above mechanism has been described as being implemented by a messaging framework, the mechanism may be implemented by another apparatus, entity or function.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 12, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising: at least one processor; and
at least one memory including computer program code, wherein the at least one memory and the computer program code are configured to, with the at least one processor, cause the apparatus at least to:
sense at least one beam, the at least one beam comprising a gNodeB reception beam and an associated gNodeB transmission beam;
determine that a channel on the at least one beam is idle during a listening period;
based on determining that the channel on the at least one beam is idle during the listening period, initiate a channel occupancy time based on the sensing;
transmit at least one first downlink transmission on the at least one beam during the channel occupancy time, wherein the at least one first downlink transmission on the at least one beam triggers at least one first uplink transmission on the at least one beam during the channel occupancy time;
receive the at least one first uplink transmission on the at least one beam during the channel occupancy time;
determine user equipment interference conditions on the at least one beam based on the at least one first uplink transmission, wherein the user equipment interference conditions are one of: low, high, or very high;
determine, based on the determined user equipment interface conditions, presence and conditions for scheduling opportunities for the at least one beam; and
based on the presence and conditions;
schedule at least one second downlink transmission or at least one second uplink transmission on the at least one beam with restriction during a rest of the channel occupancy time when the user equipment interference conditions meets at least one threshold requirement, wherein the restriction restricts a number and a duration of the at least one second downlink transmission or a number and a duration of the at least one second uplink transmission,
schedule at least a second downlink transmission or at least one uplink transmission on the at least one beam during the rest of channel occupancy time without restriction when the user equipment interference conditions are low;
schedule at least second downlink transmission or at least one uplink transmission on the at least one beam during the rest of channel occupancy time with restriction when the user equipment interference conditions are high; and schedule no second downlink transmission or at least one uplink transmission on the at least one beam during the rest of channel occupancy time when the user equipment interference conditions are very high.

2. The apparatus of claim 1, wherein the presence refers to whether the at least one first uplink transmission and the at least one first downlink transmission are to be scheduled in another phase, and wherein the conditions refer to one or more of the following: a duration, a backoff before the next COT, a maximum transmission power, a power Spectral density, a maximum effective radiated power (EIRP), a minimum antenna gain or other.

3. The apparatus of claim 1, wherein the at least one first downlink transmission comprises downlink control information.

4. The apparatus of claim 3, wherein the at least one first downlink transmission comprises multiple first downlink transmissions.

5. The apparatus of claim 4, wherein the at least one first downlink transmission comprises downlink data.

6. The apparatus of claim 4, wherein the at least one beam comprises one beam and wherein the at least one first downlink transmission comprises one or more first downlink transmissions per beam.

7. The apparatus of claim 4, wherein the one or more first downlink transmissions are consecutive.

8. The apparatus of claim 1, wherein the at least one first uplink transmission comprises uplink control information; and uplink data.

9. The apparatus of claim 8, wherein the at least one first uplink control transmission comprises a hybrid automatic repeat request acknowledgement and a channel state channel state information report.

10. The apparatus of claim 1, wherein the number and duration of the at least one second downlink transmission and at least one second uplink transmission is specific per beam or beam pair link.

11. The apparatus of claim 10, wherein the at least one first downlink transmission is addressed to multiple terminals;
wherein the at least one second downlink transmission is addressed to the multiple terminals;
wherein the at least one first uplink transmission is received from the multiple terminals; and
wherein the at least one second uplink transmission is received from the multiple terminals.

12. The apparatus of claim 1, wherein the at least one first downlink transmission is addressed to a terminal; and
wherein the at least one second downlink transmission is addressed to the terminal; or
wherein the at least one first uplink transmission is received from the terminal; or
wherein the at least one second uplink transmission is received from the terminal.

13. The apparatus of claim 1, wherein the at least one first downlink transmission comprises a number of first downlink transmission lower than a predetermined maximum number.

14. The apparatus of claim 1, wherein the user equipment interference conditions are low when a quality metrics indicated by the at least one first uplink transmission is greater than a first threshold;
wherein the user equipment interference conditions are high when the quality metrics indicated by the at least one first uplink transmission is between the first threshold and a second threshold; and
wherein the user equipment interference conditions are very high when the quality metrics indicated by the at least one first uplink transmission is greater than the second threshold or no first uplink transmission is received.

15. The apparatus of claim 14, wherein the quality metrics or the previous quality metrics comprises one or more of a channel quality indicator, a reference signal received power or a ratio of positive acknowledgements over positive and negative acknowledgments.

16. The apparatus of claim 1, wherein the restriction comprises a maximum number and a maximum duration of the at least one second downlink transmission or a maximum number and a maximum duration of the at least one second uplink transmission.

17. A method comprising:
sensing at least one beam, the at least one beam comprising a gNodeB reception beam and an associated gNodeB transmission beam;
determine that a channel on the at least one beam is idle during a listening period;
based on determining that the channel on the at least one beam is idle during the listening period, initiating a channel occupancy time based on the sensing;
transmitting at least one first downlink transmission on the at least one beam during the channel occupancy time, wherein the at least one first downlink transmission on the at least one beam triggers at least one first uplink transmission on the at least one beam during the channel occupancy time;
receiving the at least one first uplink transmission on the at least one beam during the channel occupancy time;
determining user equipment interference conditions on the at least one beam based on the at least one first uplink transmission, wherein the user equipment interference conditions are one of: low, high, and very high;
determining, based on the determined user equipment interface conditions, presence and conditions for scheduling opportunities for the at least one beam, wherein the presence refers to whether the at least one first uplink transmission and the at least one first downlink transmission are to be scheduled in another phase, and wherein the conditions refer to one or more of the following: a duration, a backoff before the next COT, a maximum transmission power, a power spectral density, a maximum effective radiated power (EIRP), a minimum antenna gain or other; and
based on the presence and conditions, scheduling at least one second downlink transmission or at least one second uplink transmission on the at least one beam with restriction during a rest of the channel occupancy time when the interference condition meets at least one threshold requirement, wherein the restriction restricts a number and a duration of the at least one second downlink transmission or a number and a duration of the at least one second uplink transmission;
scheduling at least a second downlink transmission or at least one uplink transmission on the at least one beam during the rest of channel occupancy time without restriction when the user equipment interference conditions are low;
scheduling at least second downlink transmission or at least one uplink transmission on the at least one beam during the rest of channel occupancy time with restriction when the user equipment interference conditions are high; and scheduling no second downlink transmission or at least one uplink transmission on the at least one beam during the rest of channel occupancy time when the user equipment interference conditions are very high.

18. A non-transitory computer program product comprising computer executable instructions which when executed on one or more processors cause an apparatus at least to:
    sense at least one beam, the at least one beam comprising a gNodeB reception beam and an associated gNodeB transmission beam;
    determine that a channel on the at least one beam is idle during a listening period;
    based on determining that the channel on the at least one beam is idle during the listening period, initiate a channel occupancy time based on the sensing;
    transmit at least one first downlink transmission on the at least one beam during the channel occupancy time, wherein the at least one first downlink transmission on the at least one beam triggers at least one first uplink transmission on the at least one beam during the channel occupancy time;
    receive the at least one first uplink transmission on the at least one beam during the channel occupancy time;
    determine user equipment interference conditions on the at least one beam based on the at least one first uplink transmission, wherein the user equipment interference conditions are one of: low; high; or very high;
    determine, based on the determined user equipment interface conditions, presence and conditions for scheduling opportunities for the at least one beam, wherein the presence refers to whether the at least one first uplink transmission and the at least one first downlink transmission are to be scheduled in another phase, and wherein the conditions refer to one or more of following: a duration, a backoff before the next COT, a maximum transmission power, a power spectral density, a maximum effective radiated power (EIRP), a minimum antenna gain or other; and
    based on the presence and conditions:
        scheduling at least one second downlink transmission or at least one second uplink transmission on the at least one beam with restriction during a rest of the channel occupancy time when the user equipment interference condition meet at least one threshold requirement, wherein the restriction restricts a number and a duration of the at least one second downlink transmission or a number and a duration of the at least one second uplink transmission;
        schedule at least a second downlink transmission or at least one uplink transmission on the at least one beam during the rest of channel occupancy time without restriction when the user equipment interference conditions are low;
        schedule at least second downlink transmission or at least one uplink transmission on the at least one beam during the rest of channel occupancy time with restriction when the user equipment interference conditions are high; and
        schedule no second downlink transmission or at least one uplink transmission on the at least one beam during the rest of channel occupancy time when the user equipment interference conditions are very high.

* * * * *